(No Model.)  2 Sheets—Sheet 1.

J. S. CHAMBERS & J. G. SEYMOUR.
OVEN.

No. 581,060.  Patented Apr. 20, 1897.

Witnesses:
Jas. A. Richmond.
A. B. Degges

Inventors:
John Stoup Chambers
James Gillman Seymour
by G. A. Thwar
Attorney.

(No Model.) 2 Sheets—Sheet 2.

J. S. CHAMBERS & J. G. SEYMOUR.
OVEN.

No. 581,060. Patented Apr. 20, 1897.

UNITED STATES PATENT OFFICE.

JOHN STOUP CHAMBERS AND JAMES GILLMAN SEYMOUR, OF MELBOURNE, VICTORIA.

OVEN.

SPECIFICATION forming part of Letters Patent No. 581,060, dated April 20, 1897.

Application filed January 14, 1897. Serial No. 619,224. (No model.) Patented in Victoria September 23, 1895, No. 12,543; in Western Australia December 24, 1895, No. 1,008, and in New Zealand March 20, 1896, No. 8,352.

*To all whom it may concern:*

Be it known that we, JOHN STOUP CHAMBERS and JAMES GILLMAN SEYMOUR, merchants, subjects of the Queen of Great Britain, and residents of Melbourne, Victoria, have invented certain new and useful Improvements in and Connected with Ovens, (for which Letters Patent have been granted to us as follows: in Victoria, No. 12,543, dated September 23, 1895; in Western Australia, No. 1,008, dated December 24, 1895, and in New Zealand, No. 8,352, dated March 20, 1896,) of which the following is a specification.

This invention provides apparatus by which kettles, pots, flat-irons, and such like articles may be heated and in which the heat fumes, instead of passing away after heating such articles, are conducted into and around a chamber or oven containing materials or food to be heated or cooked. By the arrangement herein described the heat from the burner, which is preferably a stove-lamp or other portable heating appliance, is thoroughly expended in heating or cooking such materials or food before it passes out and away.

In order to make our invention clear, we will now refer to the accompanying drawings, in which—

Figure 1:
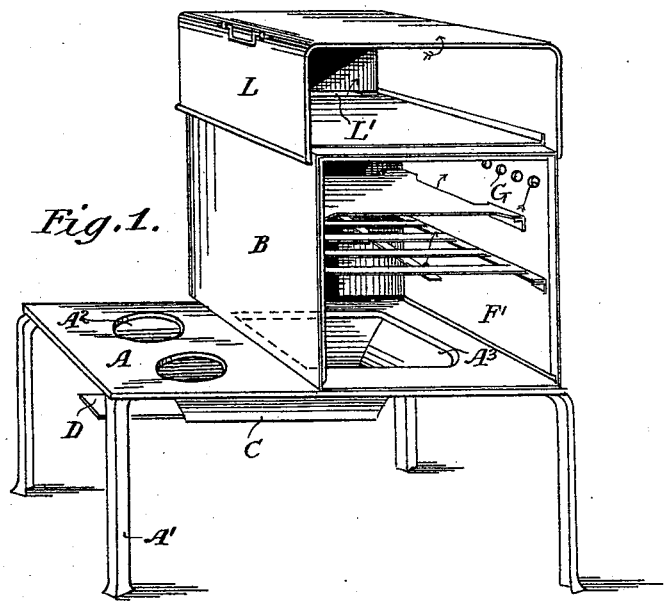
Figure 2:
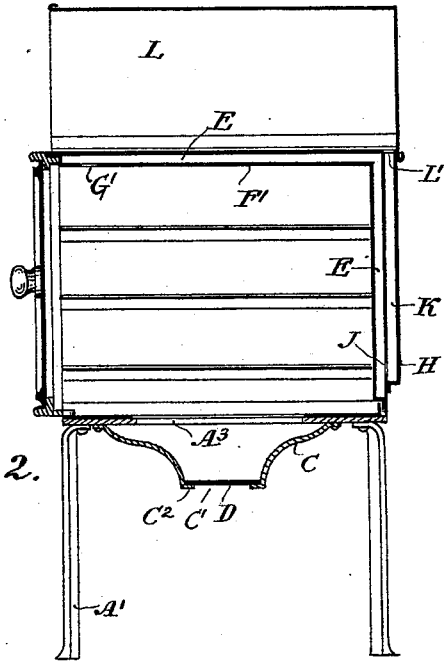
Figure 3:
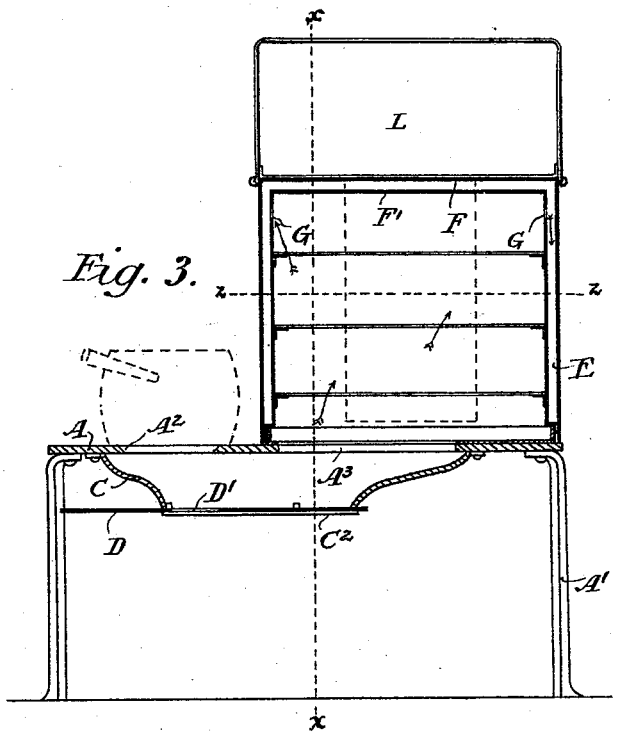
Figure 4:
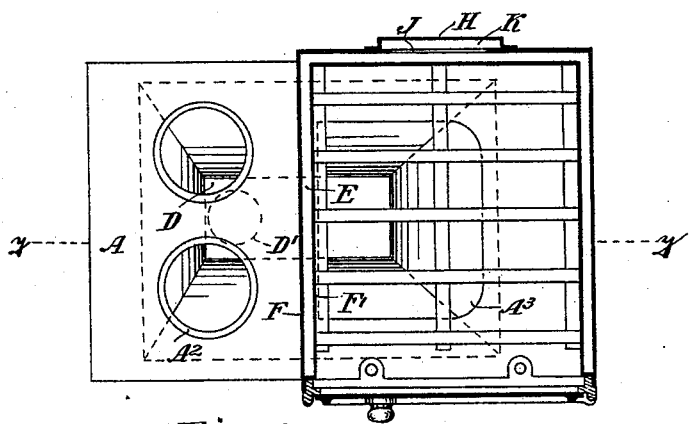

Figure 1 shows a perspective view of the apparatus with the oven-door removed. Fig. 2 shows a cross-section on line $x\ x$ of Fig. 3; Fig. 3, a longitudinal section on line $y\ y$ of Fig. 4. Fig. 4 is a sectional plan of the apparatus on line $z\ z$ of Fig. 3.

A represents a stand-plate formed of a rectangular or other shaped plate supported on suitable legs $A'$. This plate is provided with openings $A^2$ $A^3$. A specially-constructed chamber or oven B is set upon the stand over the opening $A^3$, as hereinafter described. Kettles, pots, flat-irons, or other such utensils to be heated are placed upon the stand and over the opening or openings $A^2$. These openings $A^2$ may be closed with lids when not in use. Beneath and secured to this plate is an inverted pyramidal dish or somewhat truncated cone-shaped chamber C, forming a box and having an opening $C'$ at the bottom or truncated part. The box thus formed acts as a guide to lead the heat fumes from the burner to the aforesaid openings in the stand-plate.

The apparatus, as aforesaid, is designed particularly for use with oil-gas burners or stoves. Such stove is placed beneath the stand with its burner or flame projecting into the box C, its position being determined by a slide-plate D, longer than the bottom of box C, provided with an opening $D'$. This plate is arranged to slide in guides formed by turned-in portions $C^2$ of the box C. The slide-plate may be moved so that the opening $D'$ will lie beneath the pot to be heated upon the stand-plate, as shown in Fig. 3, or by sliding the plate to its other extremity the opening will lie beneath the oven. By this arrangement the hot air or fumes from the burner are conducted directly to the required openings under the oven or kettle, pots, &c., on the stand-plate.

The chamber or oven B, which is set upon the stand-plate, has an opening in its bottom plate to correspond with the opening $A^3$ in the stand-plate. The top, sides, and back of the oven have an outer shell F, which forms with the inner shell $F'$ a passage or jacket E for the heat fumes. The inner shells of the sides of the oven have a number of perforations G near their top. The inner top shell is also provided with similar perforations $G'$ near its front. A second outer shell H is set at the back only of the oven, (see Figs. 2 and 4,) and an opening J, formed in the shell F near its bottom, forms a passage for the fumes into the chimney K.

The oven may in some cases be provided with a hood or cover L, open at its front and provided with an opening $L'$ in its bottom plate.

The *modus operandi* of the invention is as follows: The food and other articles to be heated or cooked are placed in receptacles over the openings $A^2$ or on the trays inside the oven B, or both. The heat fumes from the burner, placed at any convenient position by the slide-plate D in the truncated chamber C, while heating the receptacle placed upon the stand-plate over the openings $A^2$, also enter the oven B and rise within it in direction shown by arrows and pass through the perforations G and G' and within the jacket E along the top and down the sides and back of the oven to the opening J in the shell F, and thence up the outer jacket or chimney K, whence they may pass away into the open air, or, in some cases, first pass through the cover or hood, which serves to retain sufficient heat for the purpose of keeping plates and like articles warm.

Having thus described our invention, what we claim as new, and desire to secure by Letters Patent of the United States, is—

In combination the oven B, having an opening in its bottom plate, the stand-plate A, having openings $A^2$ outside the oven and opening $A^3$ under and communicating with the opening in the bottom plate of the oven, the box C, open at top and bottom, secured to the under side of stand-plate A so that it communicates with all the openings $A^2$ and $A^3$, therein, and the sliding plate D, longer than the base of box C, having opening D' which may be brought directly under openings $A^2$ or opening $A^3$, as may be desired, all substantially as and for the purpose set forth.

Signed at Melbourne, in the Colony of Victoria, this 24th day of November, 1896.

JOHN STOUP CHAMBERS.
JAMES GILLMAN SEYMOUR.

Witnesses:
  A. O. SACHSE,
  L. M. FISHER.